Dec. 15, 1959     C. F. WALSH     2,917,138
STORAGE STRUCTURE FOR FARM CROPS
Filed May 20, 1955     2 Sheets-Sheet 1
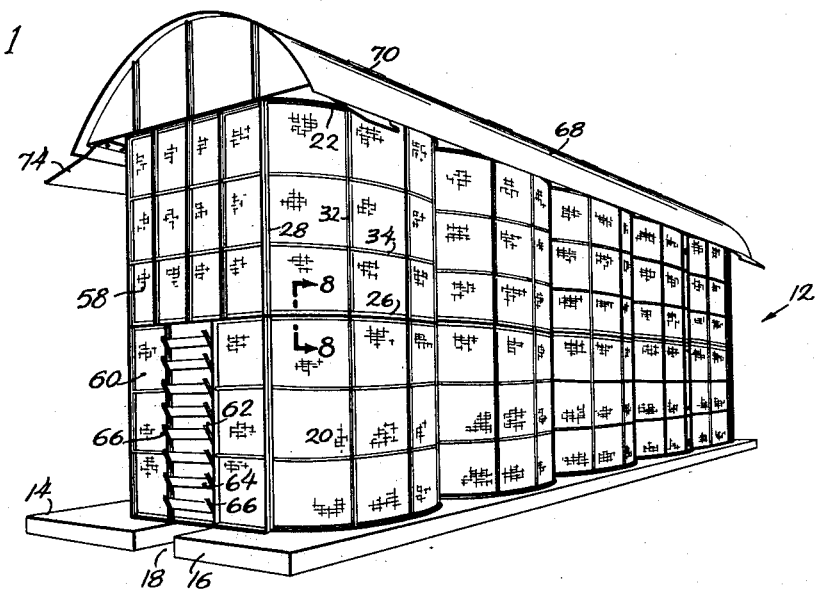
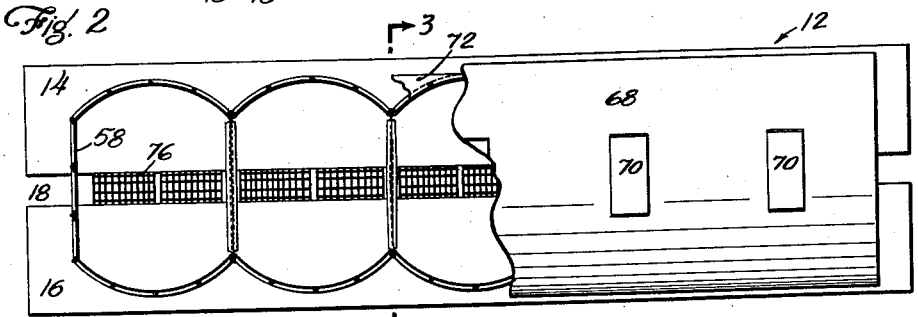
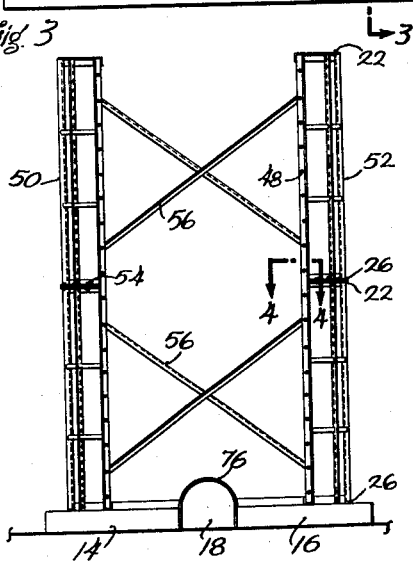
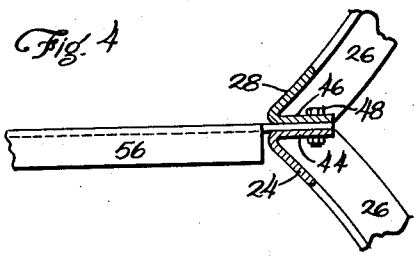
INVENTOR.
Clark F. Walsh
BY Whiteley and Caine
ATTORNEYS

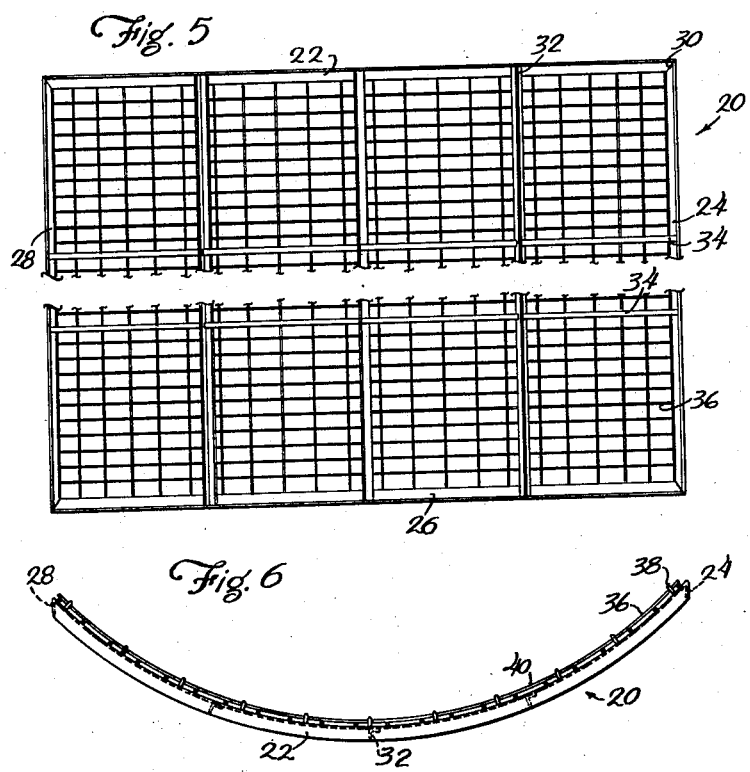
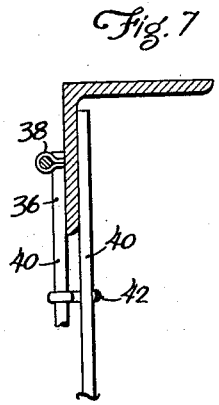
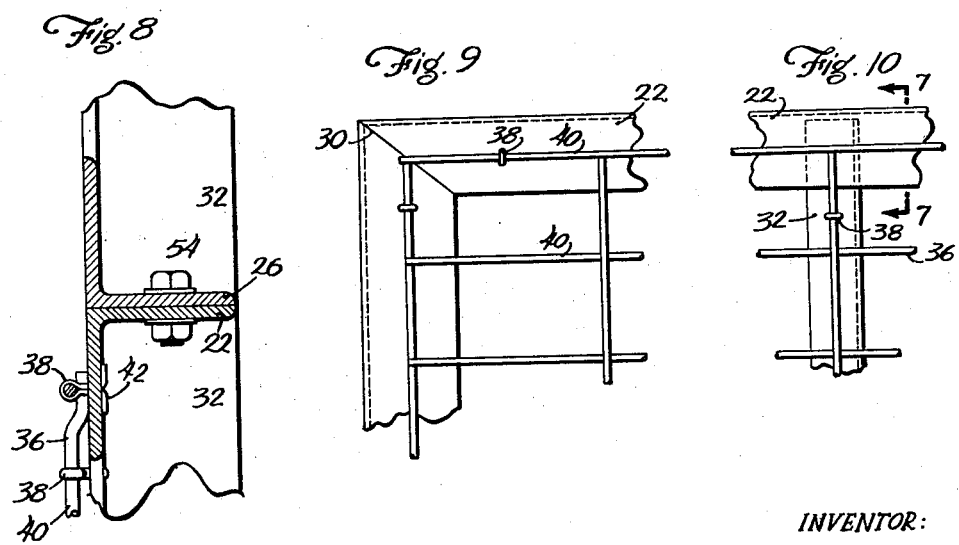

United States Patent Office 2,917,138
Patented Dec. 15, 1959

2,917,138

STORAGE STRUCTURE FOR FARM CROPS

Clark Franklin Walsh, Charles City, Iowa, assignor to Walsh Manufacturing Company, Charles City, Iowa, a corporation of Iowa Application May 20, 1955, Serial No. 509,727

4 Claims. (Cl. 189—3)

This invention relates to improvements in a structure for storing farm crops, such as ear corn or the like. In general the invention pertains to a storage building having foraminous walls formed of a plurality of arcuately curved bowed portions that are structurally reinforced for storing relatively large quantities of a farm crop requiring contact with the atmosphere. In particular it relates to a prefabricated storage structure composed of a plurality of frames or panels that may be readily joined to each other to form a completed building, and in which the panels making up the linear side walls are arcuately curved and properly reinforced to withstand the internal pressures of the stored crop, and yet produce a structure which may be made much more economical than existing structures, and thereby reduce the cost of storing the crop.

At the present time farm crops such as ear corn is stored in cylindrical cribs composed of a cylindrical skeleton that supports a wire fabric wall and a cone-shaped roof. It is recognized that the crop must be kept in contact with the air to properly dry and age, and the cylindrical structure gives the greatest economy per bushel of crop. In the past corn cribs were generally rectangular in shape and the walls were composed of spaced boards that would permit the crop to be in contact with the atmosphere. Attempts have been made to create rectangular metal cribs for storing quantities of the crop which would normally exceed the capacity of a cylindrical crib, but such efforts have not been effective because rectangular metal structures with foraminous walls would not hold their intended shape, and the walls would rupture or bow outwardly at indeterminate points as a result of the internal pressures. Any attempt to brace the walls so as to resist the internal pressure of the crop increases the cost of the building so much that it becomes completely out of proportion in relation to the cost of cylindrical cribs, and also forms a serious handicap to quick and easy erection of the structure, a factor which is highly important in storage structures of this nature.

In areas where field corn constitutes a substantial agricultural product, the farmer cannot always anticipate his storage needs, since they are variable with rainfall and climatic conditions, and therefore storage needs cannot be anticipated for any substantial period prior to harvest, wherefore it is desirable that the storage structure be of a prefabricated type and also that it be arranged for variable capacity. The present invention contemplates these needs.

In the present invention I have provided a crop storage structure for ear corn and the like, that is capable of storing larger quantities of the crop at lower cost than has heretofore been possible. An important feature of the construction is that the structure is capable of withstanding the internal pressure of a large volume of stored crop, and that the building may be extended by the addition onto one end thereof when it becomes evident that a larger storage is needed. An essential feature of the construction is that the linear sides of the building are composed of a number of arcuately curved or bowed portions properly braced with respect to each other to reduce costs and at the same time withstand the pressure of the crop. Preferably the curved or bowed portions constitute individual sections properly connected together that permit enlargement by the adding of sections thereto. The side wall sections are joined at their opposite ends by end sections, and the several sections support a roof that allows storage above the upper limits of the side walls. The building is preferably filled by introducing the crop through suitable openings in the roof, and is emptied by an unloading tunnel extending through the lower portion of the structure. A base may be constructed of concrete blocks or the like, and such a base may be readily extended when needed.

With the understanding that the side walls of the structure may in fact be composed of only two sectors of an otherwise cylindrical building laterally joined to other sectors and simple cross bracing provided, it will be evident that the cost will be materially lower than an equal number of cylindrical structures, and through the use of simple cross bracing the strength of each section of the improved building will be at least as great as that of an individual cylindrical structure.

An object of the invention is to provide an improved storage structure for farm crops embodying opposing walls formed of at least two contiguous bowed sectors that are suitably cross braced with respect to the opposite wall.

Another object is to provide a linear cross storage structure formed with opposing walls composed of a series of arched or bowed sectors that are interconnected with the opposite lateral wall and capable of resisting internal pressures of the stored crop.

Another object is to provide a prefabricated crop storage structure composed of rectangular frames curved in a vertical plane and connected laterally with each other, and cross braced with respect to an opposite wall forming a series of communicating cells that are properly braced at the areas of intercommunication to give maximum strength to the structure.

A further object is to provide a storage structure for ear corn or the like composed of a series of arcuately curved lateral wall supports, each of which carries an individual foraminous fabric panel, joined to each other, and two similar panels of an opposing wall at the inwardly curved ends of the sectors, to provide maximum strength in the lateral walls, together with a roof that extends above the limits of the side walls and provides added storage space above the limits of the walls, and above the inwardly curved edges of the side wall panels.

Other and further objects may become apparent from the following specification and claims, and in the appended drawings in which:

Fig. 1 is a perspective view of a crop storage structure forming the present invention;

Fig. 2 is a plan view of the structure shown in Fig. 1 with a portion of the roof removed;

Fig. 3 is a section taken on line 3—3 of Fig. 2, showing the interior cross bracing of the structure;

Fig. 4 is a detail view taken on line 4—4 of Fig. 3, showing the connection between the side panels and the cross braces;

Fig. 5 is a side elevation of one of the side wall panels, with portions broken away;

Fig. 6 is a top view of the panel shown in Fig. 5;

Fig. 7 is a detail taken on line 7—7 of Fig. 10;

Fig. 8 is a detail view taken on line 8—8 of Fig. 1;

Figs. 9 and 10 are detail views of portions of the panel shown in Fig. 5, disclosing the means of connecting the wire fabric to the frame.

Referring now to the several views of the drawing, the invention will be described in detail. Referring first to Figs. 1–3, general reference numeral 12 indicates in its entirety a novel storage structure for farm crops, and more specifically ear corn. Reference characters 14, 16 indicate two slabs of a ground supporting base that are separated from each other to form a withdrawal area or tunnel 18 whose purpose will be explained hereinafter. The slabs 14 and 16 may be formed of any suitable material, but for ease of erection of the structure 12 by relatively inexperienced personnel, the slabs would be preferably formed of concrete blocks or the like. Mounted on the base structure is a multicell structure shown in Figs. 1–3 but composed of a number of panels best seen in Figs. 5 and 6. Having reference to Figs. 5 and 6, a panel designated generally by reference character 20 is composed as a rectangular frame composed of peripheral angle iron members 22, 24, 26 and 28 that are suitably welded together at their several corners, one of which is designated at 30 and is also shown in Fig. 9. Extending vertically between the angle iron portions 22, 26 are a number of vertical braces 32, and similar horizontal braces 34 extend between angle iron members 24, 28. A panel 36 of foraminous material, here shown to be welded fabric, is secured onto the inner edge of frame 20, as shown in Figs. 6–10, by cotter pins 38 that circumscribe the strands of wire 40 of panel 36, and extend through suitable openings in the frame structure and the cross bracing, and have their inner ends bent as indicated by reference character 42, seen in Figs. 7 and 8. An important feature of panel 20 is that it is arcuately curved into a sector of a circle and actually forms one-fourth of a circle.

Having reference to Fig. 4, the lateral angle members 24, 28 are each bent to a 45° angle to bring their cooperating surfaces indicated at 44, 46 into parallel relationship with each other, and they are suitably secured by a bolt indicated at 48.

Having reference to Figs. 2 and 3, a pair of opposing walls 50 and 52 are formed from a series of laterally connected panels 20, and that the panels are formed in two tiers joined to each other, as shown in Fig. 8, where the upper angle iron 22 of one frame is connected to the lower angle iron 26 of the second tier by means of bolts 54.

Referring now to Figs. 3 and 4, the opposing walls 50, 52 are interconnected by cross braces designated by reference character 56 formed of angle iron and whose outer ends preferably extend between the portions 44, 46 of the side angle irons 24, 28 and are held in place by the bolts 48. The cross braces join the opposing walls at the extremities of the curved portions of panels 20 so as to brace the panels at their inner curved ends and give strength to the walls to resist internal lateral pressure exerted by the crop. It will also be evident that the cross braces 56 merely extend through the enclosed space but do not prevent a limited communication between the several cells of the building so that where needed the crop can flow from one cell to another.

Having reference to Figs. 1 and 2, the opposite ends of the lateral walls 50, 52 are connected by an upper end panel 58 which is similar in construction to panel 20 except for the curvature, and a lower end panel 60 which is substantially similar to upper panel 58 except that a door 62 is provided in the form of a number of boards, one of which is designated at 64 that slidably fit between angularly disposed abutments 66.

As best seen in Figs. 1 and 2, an arch-shaped roof 68 is mounted on the upper limits of the several walls, and inlet doors designated at 70 are provided therein for introducing the crop into each part of the structure. As best seen in Fig. 2, a flooring designated at 72 extends between the inwardly curved portions of the side walls beneath the roof and permits storage to occur above the side walls and within the curvature of the roof. Suitable rain shields 74 extend longitudinally on either side of the roof 68 to give some protection to the foraminous side walls of the building and minimize the contact between precipitation and the crop stored within the building.

As indicated in Figs. 2 and 3, by reference character 76, arcuate shaped sections of wire extend into the tunnel 18 to permit air to pass through the tunnel, and these sections are removable for unloading the crop through the tunnel.

In erecting the structure, a suitable base such as slabs 14 and 16 are laid on the ground, preferably of concrete blocks. The several frames 20 forming each of the side walls 50, 52 are then mounted thereon and laterally interconnected, as shown in Fig. 4, together with the cross bracing 56. It is preferred that the wire fabric be composed of separate panels individually mounted on each frame, to facilitate removal in the event that repair is necessary; however, where desired a single length of wire fabric could be stretched over several frames, including the end frames, provided an opening is left for door 62. It is preferred that two tiers of panels be erected one above the other to increase the capacity of the building, and it should be understood that while as here disclosed, a building is composed of upper and lower panels, the frames could be so erected as to form unitary structures for the side walls.

The roof is suitably mounted on the upper limits of the walls and the flooring section 72 inserted to seal off the space between the inwardly curved portions of the sectors.

The crop is normally introduced by means of a conventional elevator through the doors 70 of the roof, and as each cell nears filling, a man may enter and spread the crop so as to substantially fill all of the space, including the area above the flooring section 72. In unloading the building, a few of the lower boards 64 are removed and a conveyor system is projected into the tunnel. Sections 76 are periodically removed and the crop is permitted to be withdrawn through the tunnel 18.

It should be understood that if the farmer finds that increased storage space is necessary, one of the end closures may be removed and added sections of the arcuately curved walls may be added thereon, together with the other necessary parts to complete the addition.

The principal advantage of this invention resides in the reduction in cost for multiple unit storage through the use of contiguous sections of arcuately curved portions that are cross braced at their inner curved ends to give the strength of a cylinder to each section.

Another advantage resides in providing a prefabricated building that can be easily increased in volume when desired by the addition of braced curved sectors that give all the advantages of a cylinder, but at reduced cost.

It will be evident to those skilled in the art that minor variations in material and construction may be substituted within the spirit of this invention, and therefore the invention is not limited to the exact disclosure which is however a preferred form, but rather defined in the terms of the appended claims.

I claim:

1. A corn crib, comprising an upright lateral wall support formed of at least two laterally contiguous rectangular frames, each of said frames curved in convex arcs and jointed at their common edges to form a relatively wide mouthed indentation in said wall support, and a foraminous metal fabric secured to said frames and with said frames forming a ventilated wall for confining ear corn, said indentation in said ventilated wall forming a pocket for trapping moving air and directing the same against the corn confined by said ventilated wall to facilitate the drying of said corn.

2. A corn crib, comprising a pair of laterally spaced upright wall supports, each formed of at least two laterally contiguous rectangular frames, each of said frames curved in convex arcs and joined at their common edges to form aligned relatively wide mouthed indentations in each of said wall supports, and a foraminous metal fabric secured to the frames of each of said wall supports and with said frames forming a ventilated enclosure for confining ear corn, each of said indentations in said ventilated enclosure forming an individual pocket for trapping moving air and directing the same against the corn confined in said enclosure to facilitate the drying of said corn.

3. A corn crib, comprising a pair of laterally spaced upright wall supports each formed of at least two laterally contiguous rectangular frames, each of said frames curved in convex arcs and joined at their common contiguous edges to form with the frames of the opposite wall support a pair of aligned relatively wide mouthed indentations in said wall supports, opposing end wall supports each formed of a rectangular frame secured to the outermost side wall frames, bracing means extending laterally through the enclosed space between opposed indentations to brace the side wall supports with respect to each other, and a foraminous metal fabric secured to said several frames and with said frames forming a ventilated enclosure for confining ear corn, each indentation in said ventilated wall forming a pocket for trapping moving air and directing the same against the corn confined by said ventilated wall to facilitate the drying of said corn.

4. A corn crib, comprising a pair of laterally spaced upright wall supports each formed of at least two laterally contiguous rectangular frames, each of said frames curved in convex arcs and joined at their common contiguous edges to form with the frames of the opposite wall support a pair of aligned relatively wide mouthed indentations in said wall supports, opposing end wall supports each formed of a rectangular frame secured to the outermost side wall frames, bracing means extending laterally through the enclosed space between opposed indentations to brace the side wall supports with respect to each other, a foraminous metal fabric secured to said frames and with said frames forming a ventilated wall for confining ear corn, and means forming a cover over the space enclosed by the opposing side and end walls and also enclosing the upper extremity of each of the indentations in said side walls, each indentation in said ventilated wall co-acting with the covering means and forming a pocket for trapping moving air and directing the same against the ear corn confined in said enclosure to facilitate the drying of said corn.

References Cited in the file of this patent

UNITED STATES PATENTS

| | | |
|---|---|---|
| 636,869 | Turner | Nov. 14, 1899 |
| 1,247,511 | Dickelman | Nov. 20, 1917 |
| 2,571,753 | Pennington | Oct. 16, 1951 |